United States Patent
Co et al.

(10) Patent No.: US 10,489,856 B2
(45) Date of Patent: Nov. 26, 2019

(54) HYBRID INDEX DERIVED USING A KALMAN FILTER

(71) Applicant: Chicago Mercantile Exchange, Inc., Chicago, IL (US)

(72) Inventors: Richard Co, Chicago, IL (US); John Nyhoff, Darien, IL (US); John Kerpel, Chicago, IL (US); John Labuszewski, Westmont, IL (US); Fred Sturm, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 972 days.

(21) Appl. No.: 14/134,981

(22) Filed: Dec. 19, 2013

(65) Prior Publication Data
US 2015/0178834 A1    Jun. 25, 2015

(51) Int. Cl.
G06Q 40/04    (2012.01)
G06Q 40/00    (2012.01)
G06Q 40/06    (2012.01)

(52) U.S. Cl.
CPC ............. G06Q 40/04 (2013.01); *G06Q 40/00* (2013.01); *G06Q 40/06* (2013.01)

(58) Field of Classification Search
CPC ......... G06Q 40/04; G06Q 40/06; G06Q 40/00
See application file for complete search history.

(56) References Cited

U.S. PATENT DOCUMENTS

| | | | | | |
|---|---|---|---|---|---|
| 7,299,251 | B2* | 11/2007 | Skidmore | ............ | H03H 21/003 708/322 |
| 7,363,308 | B2* | 4/2008 | Dillon | ..................... | G06F 16/30 707/706 |
| 2002/0010663 | A1* | 1/2002 | Muller | ................... | G06Q 40/00 705/30 |
| 2003/0009399 | A1* | 1/2003 | Boerner | .................. | G06F 17/18 705/35 |
| 2006/0210146 | A1* | 9/2006 | Gu | ......................... | G01B 11/25 382/154 |
| 2007/0150324 | A1* | 6/2007 | Makita | ................... | G06Q 10/00 705/7.28 |
| 2011/0208632 | A1* | 8/2011 | Labuszewski | ......... | G06Q 40/00 705/37 |
| 2012/0041891 | A1* | 2/2012 | Babel | ..................... | G06Q 40/06 705/36 R |

(Continued)

OTHER PUBLICATIONS

P.J. Bolland and J.T. Connor, "A Robust Non-Linear Multivariate Kalman Filter for Arbitrage Identification in High Frequency Data", 1996, London Business School.*

(Continued)

*Primary Examiner* — Kito R Robinson
*Assistant Examiner* — Abdulmajeed Aziz
(74) *Attorney, Agent, or Firm* — Lempia Summerfield Katz LLC (57) ABSTRACT

A method of determining a hybrid index may include obtaining, by a computer device, financial transaction information about two or more financial products over a duration. The computer device may be configured to filter the financial transaction information to produce enhanced financial transaction information. The computer device may then determine a financial index value using the financial transaction information and the enhanced financial transaction information.

5 Claims, 4 Drawing Sheets

(56) References Cited

U.S. PATENT DOCUMENTS

| | | | | |
|---|---|---|---|---|
| 2012/0226645 A1* | 9/2012 | O'Rourke | ............. | G06Q 40/06 706/46 |
| 2013/0073479 A1* | 3/2013 | Koblas | ................. | G06Q 40/00 705/36 R |
| 2013/0246006 A1* | 9/2013 | Al-Mazrooei | ......... | G01C 21/16 702/190 |
| 2014/0067642 A1* | 3/2014 | Mele | ..................... | G06Q 40/04 705/37 |

OTHER PUBLICATIONS

P.J. Bolland and J.T. Connor, "A Robust Non-Linear Multivariate Kalman Filter for Arbitrage Identification in High Frequency Data", 1996, London Business School (Year: 1996).*

David Sheung Chi Fung, "Methods for the Estimation of Missing Values in Time Series", 2006, Edith Cowan University (Year: 2006).*

Kia Karelmo, Interest Rate Term Structure Modeling in the Presence of Missing Data, Sep. 2010, 84 pages.

David Sheung Chi Fung, Methods for the Estimation of Missing Values in Time Series, A thesis submitted to the Faculty of Communications, Health and Science, Edith Cowan University, Perth, Western Australia, 2006, 203 pages.

Andrea Berardi et al., Estimating Value at Risk with the Kalman Filter, Dec. 5, 2002, 18 pages.

Jean-Paul Renne, State-Space Models and Applications, Banque de France, ENSTA, 67 pages.

Greg Welch and Gary Bishop, An Introduction to the Kalman Filter, SIGGRAPH 2001, Course 8, University of North Carolina at Chapel Hill, Dept. of Computer Science, Copyright 2001 by ACM, Inc., 81 pages.

Daniele Durante et al., Locally Adaptive Bayesian Multivariate Time Series, Advances in Neural Information Processing Systems 26, edited by C.J.C. Burges and L. Bottou and M. Welling and Z. Ghahramani and K.Q. Weinberger, 2013, 9 pages.

S.J. Koopman and J. Durbin, Fast filtering and smoothing for multivariate state space models, Feb. 1998, 20 pages.

Marco Bianchi et al., A comparison of methods for trend estimation, Applied Economics Letters, 1999, 6, 103-109, Copyright 1999 Routledge, 7 pages.

Jin-Lung Lin, A Practical Guide to State Space Modeling, Institute of Economics, Academia Sinica Dept. of Economics, National Chengchi University, Mar. 2006, 15 pages.

Chapter 18, State estimation with Kalman Filter, http://home.hit.no/~hansha/documents/ control/theory/stateestimation_with_kalmanfilter.pdf, accessed Nov. 27, 2013, 27 pages.

* cited by examiner

HYBRID INDEX DERIVED USING A KALMAN FILTER

BACKGROUND

Different indexes have been referenced as the basis for cash-settled financial products (e.g., financial contracts) including futures and options for many years. For example, many traded stock index futures are often based on a price index representing the current price of the plurality of securities underlying the index. Ideally, these indexes would be constructed by reference to observed transactions in the market in question. Sometimes, however, it may be difficult or impossible to observe all of those transactions. For example, trading may simply be sporadic, episodic or "thin" in a particular market. In some cases, regulatory or commercial barriers may exist and hinder access to such information. When trading information is sparse, values of the securities in question may be estimated by one or more different methods, sometimes referred to as "matrix pricing". However, these methods often fail to account for "noise", in the data used when estimating missing financial information. For example, such financial noise may include price and/or volume fluctuations that may not accurately reflect a market direction. For example, when referenced to equities, market activity caused by program trading, dividend payments and/or other phenomena may not be reflective of overall market sentiment.

SUMMARY

This Summary is provided to introduce a selection of concepts in a simplified form that are further described below in the Detailed Description. This Summary is not intended to identify key or essential features of the invention.

In some embodiments, a method of determining a hybrid index may include obtaining, by a computer device, financial transaction information about two or more financial products over a duration. The computer device may be configured to filter the financial transaction information to produce enhanced financial transaction information. The computer device may then determine a financial index value using the financial transaction information and the enhanced financial transaction information.

In some embodiments, a method may include obtaining, by a computer device, financial transaction information about two or more different financial products into a time series for each of the two or more financial products. The method may further include determining, by the computer device, an enhanced time series of financial transaction information for each of the two or more financial products using a Kalman filter and/or a spline algorithm. Once determined, the method may include determining a financial index value based, at least in part, on the enhanced time series of financial transaction information. The financial index value may be associated with a specified duration.

In some embodiments, a computer system may be configured for providing a financial index value and may include at least a processor and a non-transitory memory communicatively coupled to the processor. The memory may be configured to store instructions, that when executed, cause the processor to apply a recursive filter to each of two or more time series of financial transaction information. In some cases, the recursive filter may be configured to provide an estimate of a next financial transaction value in the respective time series. The instructions may further cause the processor to determine a financial index value associated with the two or more time series of financial transaction information. In some cases, the financial index value may be used for determining at least a cash settlement value associated with a financial product based, at least in part, on the financial index value.

Embodiments include, without limitation, methods for determining a margin requirement for an account, computer systems configured to perform such methods, and computer-readable media storing instructions that, when executed, cause a computer system to perform such methods.

BRIEF DESCRIPTION OF THE DRAWINGS

Some embodiments are illustrated by way of example, and not by way of limitation, in the figures of the accompanying drawings and in which like reference numerals refer to similar elements.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

In some cases, a financial index may be used as a basis for one or more financial products, such as a cash-settled financial contract (e.g., an options contract, a futures contract, etc.). These indexes may be constructed in reference to observed transactions in one or more associated financial markets. Illustrative markets may include an energy market (e.g., oil, gasoline, natural gas, ethanol, diesel, etc.), a currency market (e.g., Dollar, Euro, Pound, Yen, etc.), a banking market (e.g., an intra-bank loan interest rate), a stock market, a bond market, a metals market (e.g., aluminum, gold, platinum, palladium, copper, silver, etc.), a commodity market (e.g., corn, wheat, soybeans, rice, hogs, pork bellies, etc.), a real estate market (e.g., commercial, residential, etc.), and/or the like. Sometimes, however, the transactions may be difficult to observe. In some cases, the financial transactions may be sporadic, episodic or otherwise "thin" in relation to a particular market. In some cases, a futures product may be designed to be cash settled to a volatility index, such as a volatility of a financial market. As such, there remains a need for improved systems and techniques to determine a hybrid index and/or financial products based on the hybrid index with one or more financial markets that can, at least partially, compensate for missing, sporadic or otherwise noisy financial transaction information.

Exemplary Operating Environment

Figure 1:
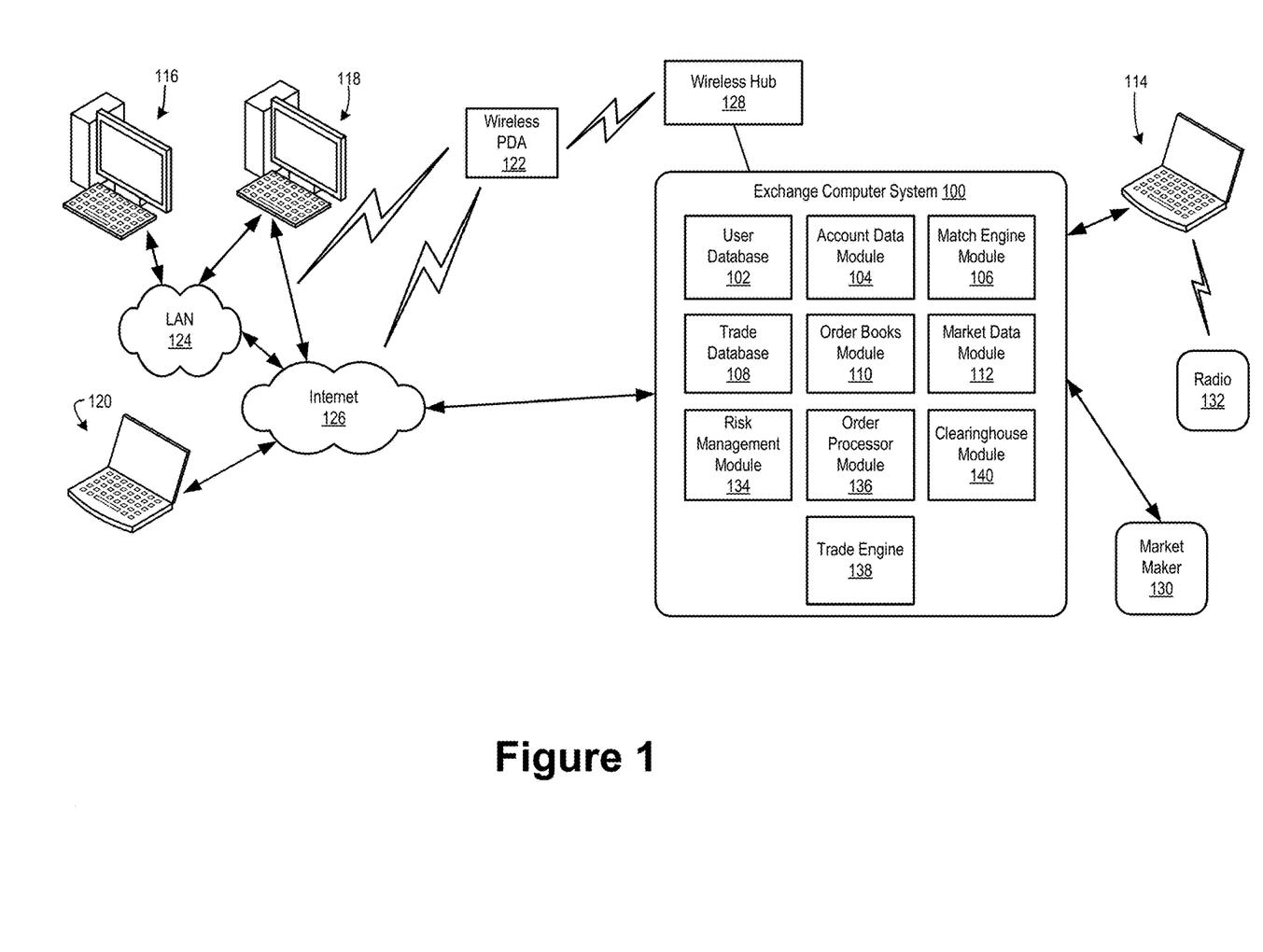
FIG. 1 shows an exemplary trading network environment for implementing trading systems and methods according to at least some embodiments.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 140 may be included as part of exchange computer system 100 and configured to carry out clearinghouse operations. Module 140 may receive data from and/or transmit data to trade database 108 and/or other modules of computer system 100 regarding trades of futures contracts, futures contracts options, OTC options and contracts, and other financial products. Clearinghouse module 140 may facilitate the financial product exchange acting as one of the parties to every traded contract or other product. For example, computer system 100 may match an offer by party A to sell a financial product with a bid by party B to purchase a like financial product. Module 140 may then create a financial product between party A and the exchange and an offsetting second financial product between the exchange and party B. As another example, module 140 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 140 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-140).

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may implement one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics, radio links or other media.

A wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet. Computers 116, 118 and 120 may communicate with each other via the Internet 126 and/or LAN 124.

One or more market makers 130 may maintain a market by providing constant bid and offer prices for a derivative or security to exchange computer system 100. Exchange computer system 100 may also include trade engine 138. Trade engine 138 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer device 116 may include computer-executable instructions for receiving market data from exchange computer system 100 and displaying that information to a user. As another example, clearinghouse module 140 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

In at least some embodiments, the exchange computer system 100 (or "system 100") receives, stores, generates and/or otherwise and processes data to provide a hybrid index that may be based on enhanced financial transaction information (e.g., an estimated value, a filtered value, one or more smoothed values, etc.) about two or more financial products exchanged in a financial market. For example, as discussed below, a method of determining the hybrid index may be done using an actual data set including information about financial transactions involving the one or more different financial products upon which the hybrid index is based. In some cases, a financial transaction data set may include pricing information, interest rate information, volatility information, and the like, associated with the different financial products. Sometimes, the data set may include "noise" that may have an effect on the gathered information. For example, pricing information may be affected, either positively or negatively, by earnings reports, unfavorable news events, rumors, or the like. Such effects may cause the gathered financial transaction information to inadequately reflect an actual status of the particular financial product. In some cases, the financial transaction information may not be available during a particular time period. For example, a particular financial product (e.g., a mortgage-backed security) may be traded during that particular time period, thus no price may be reported. By estimating and/or filtering the financial transaction data, the exchange computer system 100 may be capable of enhancing any gathered transaction information about the two or more financial products and using the enhanced financial transaction information to compute a hybrid index. that may more accurately reflect a status of the different financial products. In some cases, the financial exchange may desire to create a financial product (e.g., a futures contract, an options contact, a mutual fund, an exchange traded fund, etc.) may be based, at least in part, on the determined hybrid index, such as for computing a settlement price and/or a daily mark-to-market price.

For example, a financial index may be based on interest rate information based on observed bank rates used in actual financial transactions. For example, the London Interbank Offered Rate (LIBOR) may typically be calculated using interest rates reported by banks. However, such interest rates may be subject to manipulation and/or erroneous reporting of interest rates. As an alternative, financial transactions between banks may be monitored such that interest rate information may be observed from the actual financial transactions. In some cases, however, such financial transactions may be sparse for a particular time period. In such cases, interest rate information may be imputed using data from banks who did not report a transaction by reference to their credit characteristics relative to observed transactional bank rates and/or by reference to general interest rate trends. In such cases, such estimated data may be smoothed and/or filtered using a filter (e.g., a Kalman Filter) that may or may not include a spline algorithm (e.g., a vector spline, a cubic spline, a B-spline, an M-spline, a Bézier spline, etc.). This enhanced data may then be used to compute the index value. By using this technique, different indexes may be computed from an incomplete set of transactional data that has been enhanced by imputed and/or filtered data. For example, an index may be computed based on prices of a physical commodity, where the commodity may be priced at various locations. In another example, an index may be constructed using transacted exchange rates from various market participants, where the exchange rates may vary as a function of bank credit risks. Another index may be constructed as an index of implied volatilities, such as a volatility of a derivatives product (e.g., an option). For example, the implied volatilities may be calculated using a mathematical option pricing model that may reference one or more transacted prices and/or premiums in the particular option. These implied volatilities may be supplemented by imputed volatilities computed for an option where no transactions occurred. In such cases, the filtering techniques discussed herein may be readily adaptable to such situations and may provide a more accurate and/or reliable index value.

Many currently available indexes may be calculated using a combination of transaction data and imputed data. However, current systems used for calculating the indexes are unable to handle estimation of missing values with the elegance and/or accuracy of the filtering techniques discussed herein, such as by using a Kalman filter with or without a smoothing spline algorithm. For example, some bond indexes (e.g., the Barcap U.S. Aggregate Bond Index, etc.) reference transactional data, where available, and supplement the transactional data with imputed data for many other index components. The Barcap U.S. Aggregate Bond Index may be considered the most commonly referenced benchmark of domestic fixed income returns available today. This index references thousands of fixed income securities including U.S. Treasuries, Mortgage Backed Securities (MBS), corporate bonds, Asset Backed Securities (ABS) and other issues. However, a relatively small number of these securities may actually trade on any given day resulting in sparse transaction data for use when calculating the index value. To remedy this situation, these missing values may be imputed by examining the bid-offer (if any) in the particular security and/or by surveying traders in these securities regarding the appropriate price. In some cases, the values may be imputed by calculating the possible price or value of these securities by reference to a (known) coupon, a maturity date and/or a yield derived by examining the yield movement in other similar securities. This process is often referred to as "matrix pricing."

In some cases, a futures exchange (e.g., the Chicago Mercantile Exchange (CME) Group) may impute and/o estimate a value of a futures contract that was not traded on a given day to serve as the daily settlement price. In some cases, much of the futures trading activity may occur in the nearby or front month futures with possibly little or no trading on a given day in deferred or back month futures. However, the back month futures contracts may have outstanding positions and/or open interest, causing the futures exchange to impute, for example, a value for purposes of calculating a daily mark-to-market (MTM) price. Futures exchanges may impute such values by reference to a last observed transactional price in the contract that may be adjusted by reference to price movements in futures contracts which did book transactions, such as by reference to one or more spread relationships. In other cases, Options exchanges may impute the value of an option that did not trade on a given day to identify a daily settlement price and/or to administer a daily MTM. In such cases, the options exchange may use an option pricing model that may reference to an assumed volatility based upon implied volatilities associated with options that did exhibit trading activity that day. However, the above mentioned techniques cannot account for "noise" introduced into the data. By applying a filter, such as a Kalman filter, and/or a smoothing spline algorithm, the impact of the noise may be significantly reduced or eliminated.

Figure 2:
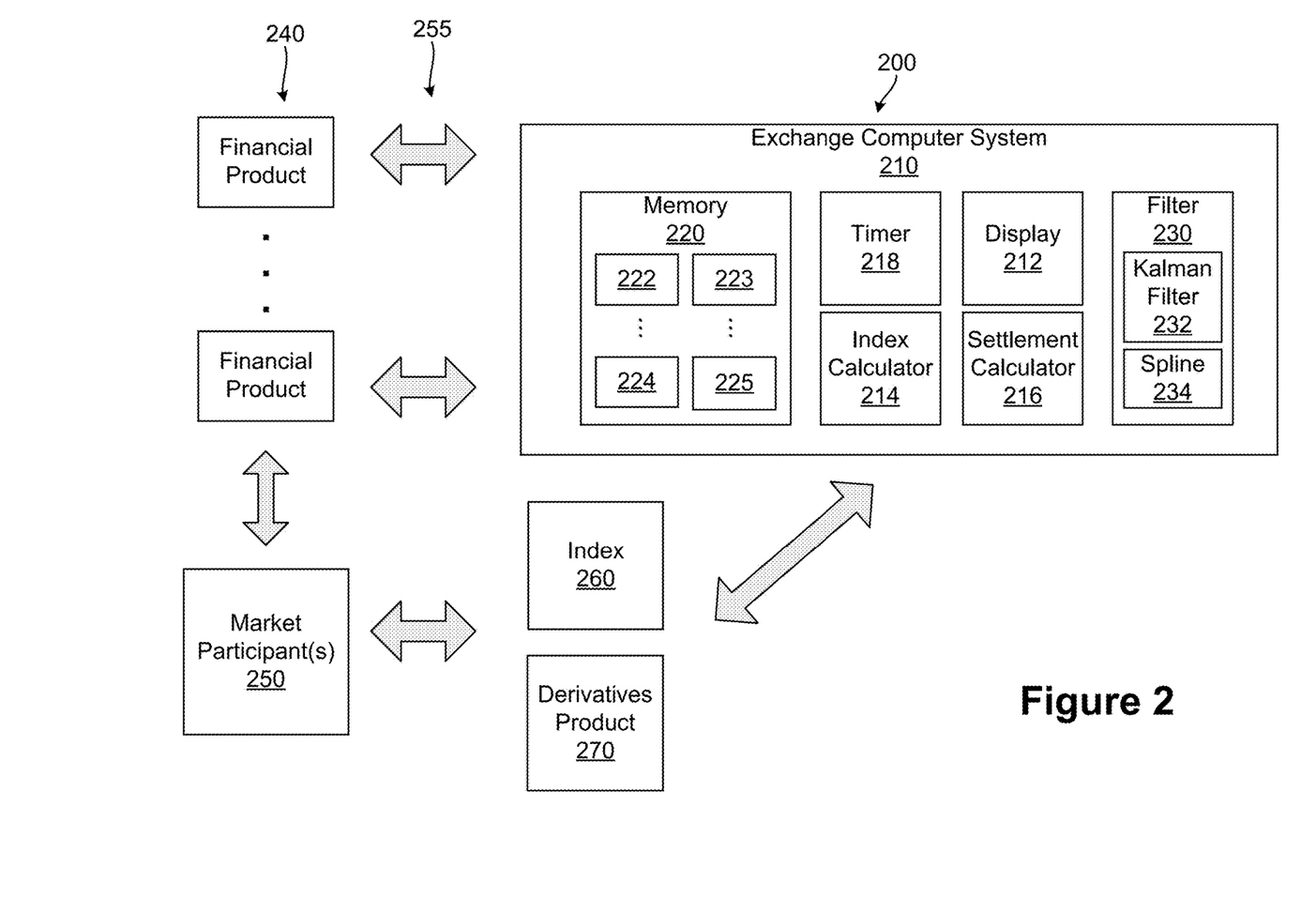
FIG. 2 shows a block diagram representation of a system for determining and/or using a hybrid index constructed using enhanced financial transaction data according to at least some embodiments.

FIG. 2 shows a block diagram representation of a system 200 for determining and/or using a hybrid index constructed using enhanced financial transaction data according to at least some embodiments. For example, a computer system, such as the exchange computer system 100 of FIG. 1 (e.g., an exchange computer system 210) may include a memory device 220, a display 212, a filter 230, an index calculator 214, a settlement calculator 216, and/or a timer 218. In some cases, the exchange computer system 210 may be configured to provide, or otherwise determine, a hybrid index 260 associated with two or more different financial products 240 that may be traded on a particular financial market. In some cases, the hybrid index may be provided to a market participant, such as via the display 212, and/or may be used to compute a cash settlement price of a futures product 270 based, at least in part on the hybrid index 260. In some cases, one or more values of the hybrid index may be computed using one or more mathematical algorithms based on transaction information (e.g., a price, an interest rate) obtained from one or more transactions of the financial products 240 on a financial market during a particular time frame (e.g., 1 hour, 8 hours, 24 hours, trading hours of a particular financial market 230, a week, a month, a week, a month, etc.). In some cases, the financial transaction information may be received by the exchange computer system 210 over a network 255 (e.g., the internet). Once the financial transaction information is received, the exchange computer system may store the received financial transaction information in the memory device 220. The memory device 220 may be implemented with one or more physical or magnetic memory devices, such as a disk drive, magnetic memory, optical disk, or other device used to store computer-executable instructions. In one embodiment, the memory device 220 may be implemented with a random access memory RAM of a processor (not shown). In some cases, the memory device 220 may include a state space model associated with at least a portion of the financial market that may be used by the filter 230 when implementing the Kalman filter 232 and/or the spline 234.

In some cases, the exchange computer system 210 may store the financial transaction information as a time-series of data ordered over a temporarily static time period, as discussed in reference to FIG. 3 below. For example, transaction information about a first financial product 240 may be stored as a first time series 222 and transaction information about a second financial product 240 may be stored as a second time series 224. Once ordered, the exchange computer system 210 may be configured to smooth or otherwise filter, the stored time series 222, 224 of financial data using the filter 230. For example, the exchange computer system may apply a Kalman filter 232, with or without the smoothing spline 234, to each time series 222, 224. In doing so, the filter 230 may smooth the data, thus reducing noise, and/or may be used to impute one or more missing data entries in the time series 222, 224. In some cases, the exchange computer system 210 may include a timer 218 for determining a timeframe or sampling the financial transaction data of the two or more financial products 240 and/or for determining a time period over which to calculate the hybrid index value 260. Sometimes, the timer 218 may be included in another computer device associated with the exchange computer system 100. In such cases, information about one or more timeframes used for sampling the financial transaction data and/or for computing hybrid index value may be communicated to the exchange computer system 210 via a network 255.

In some cases, the exchange computer system 210 may be configured to apply the filter 230 to smooth noisy financial transaction data and/or to impute missing financial transaction information stored in the time series 222, 224, such as to produce respective enhanced time series 223, 225. For example, the first time series 222 may be smoothed using the filter 230 and the resulting enhanced time series 223 may be stored in the memory device 220. Similarly, the second time series 224 may be missing at least one entry in the time series 224. In such cases, the exchange computer system 210 may apply the filter 230 to the time series 224 to impute the missing data, such as by using a recursive filter (e.g., the Kalman filter 232, an Extended Kalman filter, an Iterated Extended Kalman Filter, etc.). Additionally, the resulting enhanced time series 235 may (or may not) be smoothed using the spline 234. The filter 230 may be configured to apply an interpolation technique known as a vector spline 234 (e.g., a cubic spline, a B-spline, an M-spline) implemented using an iterative filter, such as the Kalman filter 232. The spline 234 may be considered a piecewise polynomial function that can be used to smooth data and/or to impute missing data observations. In some cases, the spline 234 may be made continuous to a defined differentiability (e.g., a cubic spline may be considered continuous to a second derivative) and may possesses a high degree of smoothness at the places where the polynomial pieces connect, also known as knots. In some cases, cubic splines may be chosen as being easily implemented and having a curve that appears seamless. For example, a straight polynomial interpolation of evenly spaced data may cause distortions to appear in the data. However, cubic splines, B-splines, M-splines avoid this problem, but they are only piecewise continuous, meaning that a sufficiently high derivative (third) is discontinuous. In some cases, the spline 234 may include a cubic spline that may be considered an interpolated function that is continuous to a second derivative. A B-spline may be considered a piecewise polynomial function built from fundamental units defined on some sub-interval $[x_0, x_N]$ that are continuous to a second derivative at the boundaries of the intervals. These functions form a set of basis functions, as a linear combination of these functions that satisfy the continuity properties at the boundaries between adjacent intervals. In another example, M-splines may be used, where the M-spline may be used directly as basis splines for regression analysis involving positive response data. However, the use of the M-spline would constrain any regression coefficients to be non-negative. Typically, the spline 234 may be characterized by a smoothing parameter (λ) that may be used for determining a smoothness of one or more of the piecewise polynomial functions forming the spline. Care may be taken when specifying the smoothing parameter (λ), as higher values may allow for a smoother spline. However these higher values may reduce a fit of the spline to a give data set.

In some cases, the filter 230 may include a two-part filter process, such that an future state may be estimated and then this future state estimate may be updated using an actual observed value obtained from the system in question (e.g., reported financial transactions in one or more financial markets). In some cases, these actual observed values may include noise. In general, a Kalman filter 232 is a set of mathematical equations that facilitate an efficient method for calculating an estimate of a state of a process, while minimizing a mean of a squared value of the error introduced into the process. In doing so, the Kalman filter 232 may support estimations of past, present, and even future states, even when the precise nature of the modeled system is unknown. In other words, the Kalman filter 232 may be considered an optimal estimator that may be used to impute parameters of interest from indirect, inaccurate and/or uncertain observations. The Kalman filter 232 is recursive so that newly observed information may be processed as it arrives. In many cases, the Kalman filter 232 may be used for filtering data obtained in a discrete time system. For example, the Kalman filter 232 may be used on a data set that has been sampled at discrete points over a period of time (e.g., a time series).

In some cases, the Kalman filter 232 may be represented as follows:

$$x_k = F_k x_{k-1} + B_k u_{k-1} + w_k \quad \text{(Equation 1)}$$

where $x_k$ represents an actual state of the system at a time k, where the state at time k is related to the state of the system at the previous time (k−1). $F_k$ represents a state transition model that may be applied to the previous state $x_{k-1}$, $B_k$ represents a control-input model that may be applied to a control signal $u_{k-1}$, and $w_k$ corresponds to noise within the process. Often, no control signal is present making the equation:

$$x_k = F_k x_{k-1} + w_k \quad \text{(Equation 2)}$$

the process noise $w_k$ may be included in a zero mean multivariate normal distribution with a covariance of $Q_k$:

$$w_k \sim N(0, Q_k) \quad \text{(Equation 3)}$$

At time k, an observation $z_k$ of the state $x_k$ corresponds to:

$$z_k = H_k x_k + v_k \quad \text{(Equation 4)}$$

where $H_k$ is an observation model for mapping the state space into the observed space and $v_k$ corresponds to observation noise, which is different from the process noise and is drawn from:

$$v_k \sim N(0, R_k) \quad \text{(Equation 5)}$$

The initial state of the system $x_0$, and the noise vectors $w_k$ and $v_k$ are assumed to be mutually independent.

The Kalman filter 232 may be defined as an algorithm comprising a set of equations used to estimate a (mostly) linear model. At a basic level, the Kalman filter may include a measurement equation that may be used to measures some type of output variable of a system (e.g., yield) and a transition equation that may be used to estimate an underlying latent state of a the system. The Kalman filter algorithm may be configured to recursively calculate estimates of a system state based on a linear combination of at least a previous estimate and any new observations that have been made. For example, Kalman filter 232 may compute new estimates of a state of interest by taking a weighted average of a prediction based on the previous estimate and a new observation of the system of interest. The Kalman filter may be thought of as a two-step process, including a prediction step and an updating step. For example, during the prediction step, the Kalman filter 232 may produce an estimate of a current state variable, along with any associated uncertainties. In the updating step, once the next measurement has been taken (e.g., receiving desired financial transaction information), is observed, the estimates from the prediction step are updated using a weighted average (e.g., a Kalman gain), where more weight may be given to estimates having a higher certainty. As the measurement is coming from an actual system, the measured data may include some error value, such as random noise). Because the algorithm operates recursively, the Kalman filter 232 may be used in real-time and requiring only the present input measurements and a previously calculated state. No other past information is necessary. The Kalman filter 232 may be used to estimate a variance in both the measured financial transaction information and the transition equations of the filter. These variances may be used for calculating the smoothing parameter (λ) of an associated spline 234. The Kalman filter 232 algorithm may be used when the measured time series 222, 224 are discontinuous (e.g., include missing values). For example, any missing values may not affect the operation of the Kalman filter calculations of the variances and/or the smoothing parameter (λ), as these parameters are estimated as a maximum likelihood.

In an illustrative example, actual LIBOR transactions, as conducted by lending banks, may be used to calculate an index, rather than relying on rates reported in a survey of a variety of banks Currently, Currently, LIBOR rates are calculated and published by the British Bankers Association (BBA) based upon values surveyed from a variety of banks LIBOR is used to represent a rate at which banks may make unsecured loans amongst themselves. However, it may be desirable to reference actual LIBOR transactions, as conducted by the banks, rather than relying on surveyed and/or other "indicative" values. However, not all such banks that participate in the survey may have been a party to a LIBOR transaction within the desired time period, such as at or near a coordinated point in time at which the index is calculated. However, a hybrid index, calculated according to at least some embodiments, may be calculated using the enhanced time series 223, 225 calculated by reference to rate activity and credit circumstances data using the filter 230. Such data is represented in the graph of FIG. 3.

Figure 3:
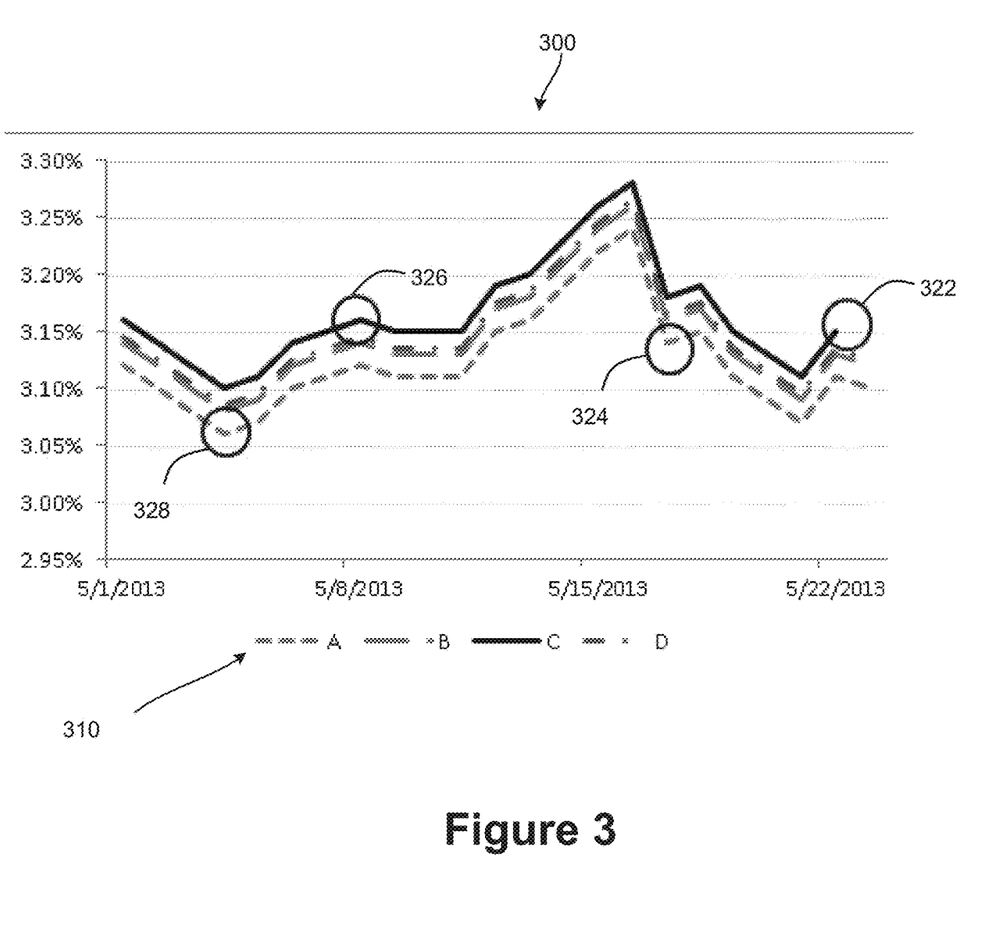
FIG. 3 shows an illustrative representation of data used when enhancing observed financial transaction data according to at least some embodiments.

FIG. 3 shows an illustrative graph 300 of data used when enhancing observed financial transaction data according to at least some embodiments. For example, four banks 310, A, B, C, and D, may provide daily values associated with a transaction with another bank, such as a 90 day LIBOR. The 90 day LIBOR corresponds to a yield derived from the underlying asset, such as a 90-day Eurodollar time deposit. As can be seen, the each bank 310 has a time series illustrated on the chart 300 corresponding to a yield associated with a transaction reported on a particular date. However, in some cases, a bank 310 may not participate in a transaction. For example, at 322 and corresponding to the illustrative date May 23, 2013, Bank C does not have a transaction occurring that day. As such, the data set for bank C would be incomplete causing the index not to be calculable for that day, or would cause the index to be calculated using an incomplete data set. However, by using the filter 230, the exchange computer system 210 would be able to impute a yield for that day and allowing for the index value to be calculated by the index calculator 214. As mentioned previously, yields in one or more of the time series may be subject to noise, such as news unrelated to the transaction, such as the points 324, 326, and 328. The filter 230, such as by using the Kalman filter 232 and the spline 234, may be used to smooth the time series data such that the index calculator 214 may provide a more accurate index value. For the missing data point 322 and/or the noisy data points 324, 326, 328, a smoothed value obtained by using an application of the spline 234 and/or the Kalman filter 232, which may then be used by the index calculator 214 when calculating the index.

Returning to FIG. 2, the spline 234 may be a vector spline that may be used for estimating and/or smoothing values in one or more time series at the same time. As such, the spline 234 may provide a smoothed and/or filtered estimate that is internally consistent may be considered optimal. For example, illustrative equation used as the spline 234 may be written as $$y_i = \theta(t_i) + \varepsilon_i \quad \text{(equation 6)}$$

$$E(\varepsilon_i) = 0 \quad \text{(equation 7)}$$

$$Var(\varepsilon_i) = \Sigma_p, i = 1 \ldots n \quad \text{(equation 8)}$$

Where $y_i$ may be a p×1 vector response. Using the illustrative data set of FIG. 3, p is 4 and the response is the 90 day LIBOR time deposit. $\theta(\cdot)$ is an arbitrary smooth vector function that may include different piecewise polynomial equations and the errors $\varepsilon_i$ are mutually uncorrelated. The variance of the errors, $\Sigma_i$, may be a p×p matrix for linking the p different time series through correlations of the disturbances driving the different components (e.g., the 90 day LIBOR time deposit of the individual banks 310). All these parameters may be estimated from the time series data using a maximum likelihood calculation, thus providing a "best fit" (e.g., minimizing a generalized least squares criterion). The spline 234, when implemented as a vector spline, may be used to provide more accurate estimates than a univariate spline because of possible correlation amongst the errors.

In reference to FIG. 3, the smoothed value from the spline can be used in place of the rate missing for Bank C and the index can thus be computed by the index calculator 214. The Kalman filter 232 may also be particularly well suited for online estimation as only the prior state mean and variance need to be stored to project (e.g., extrapolate) future values. For example, In a continuous time case, the implementation of a spline 234 (e.g., a vector cubic spline) in conjunction with a filter (e.g., the Kalman filter 232) may be represented as follows:

$$y_i = \mu_i + \varepsilon_i \quad \text{(equation 9)}$$

$$\mu_{i+1} = \mu_i + \delta_i \upsilon_i + \eta_i \quad \text{(equation 10)}$$

$$Var(\eta_i) = \frac{\delta_i^3}{3} \Lambda \quad \text{(equation 11)}$$

$$\upsilon_{i+1} = \upsilon_i + \zeta_i \quad \text{(equation 12)}$$

$$Var(\zeta_i) = \delta_i \Lambda \quad \text{(equation 13)}$$

$$\text{where: } \mu_i = \theta(t_i), \quad \text{(equation 14)}$$

$$\delta_i = t_{i+1} - t_i, \quad \text{(equation 15)}$$

$$\Lambda = \text{diag}(\lambda_1 \cdots \lambda_p), \text{ and,} \quad \text{(equation 16)}$$

$$\lambda_p = \frac{\sigma_{\varepsilon_p}^2}{\sigma_{\zeta_p}^2}. \quad \text{(equation 17)}$$

In some embodiments, no smoothing spline may be used, such that the continuous time equations used by the filter 230 may be represented, where $\mu_i$ is a vector, as:

$$y_i = \mu_i + \varepsilon_i \quad \text{(equation 18)}$$

$$\mu_{i+1} = \mu_i + \upsilon_i + \eta_i, \eta_i \sim (0, \sigma_{\eta_i}^2) \quad \text{(equation 19)}$$

$$\upsilon_{i+1} = \upsilon_i + \zeta_i, \eta_i \sim (0, \sigma_{\zeta_i}^2) \quad \text{(equation 20)}$$

Once the time series 222, 224 have been processed using the filter 230, such as to smooth the data and/or to impute one or more missing entries, the resulting enhanced time series may be stored in the memory device 220 as the enhanced time series 223, 225. Once available, the index calculator 214 may be configured to compute an index value 260. For example, the index calculator 214 may be configured to apply a mathematical algorithm to the two or more different enhanced time series 223, 225 to compute the index value 260. For example, for a particular time period, the index calculator may apply a weighting factor to an entry corresponding to the time period from the first enhanced time series 223 and a different weighting factor to a corresponding entry in the second enhanced time series 225. In some cases, the particular mathematical algorithm used by the index calculator 214 may be related to a particular market and/or a particular grouping of financial products 240 being monitored. Once calculated, the index 260 may be used as a basis for a derivatives product 270 as defined by a financial entity (e.g., a brokerage, an exchange, a bank, etc.). In such cases, the exchange computer system may include the settlement calculator 216 to compute a settlement value and/or a mark to market value associated with the futures product. Additionally, the exchange computer system may allow a market participant 250 to view, or otherwise access, the index value 260, such as for use when making a financial transaction and/or analyzing potential financial transactions. In some cases, the display 212 may be used to provide access to the index value 26 and/or information about the derivatives product 270. The display 212 may be included as a part of the exchange computer system 210 and/or may be remote from the exchange computer system. For example, the display 212 may be configured to remotely access information from the exchange computer system, such as via the network 255.

Figure 4:
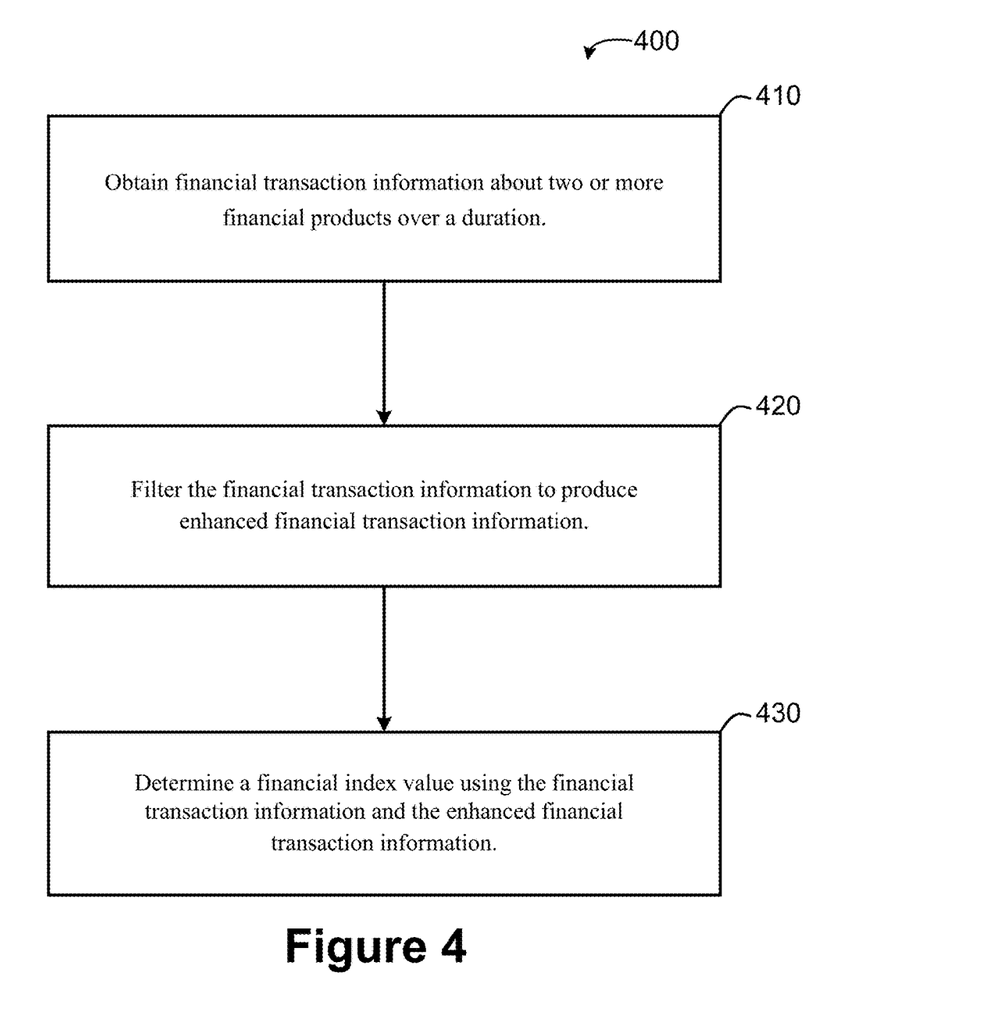
FIG. 4 is a flow chart showing steps performed in methods according to at least some embodiments.

FIG. 4 is a flow chart showing steps performed in methods according to at least some embodiments. In some cases, an illustrative method 400 may begin at 410 by obtaining, by a computer device (e.g., the exchange computer system 210), financial transaction information about two or more financial products 240 over a duration. At 420, the exchange computer system may filter, such as by using the filter 230, the financial transaction information about the two or more financial products 240 to produce enhanced financial transaction information. For example, the filter 230 may filter the time series 222, 224 to produce respective enhanced time series 223, 225. At 430, the exchange computer system, such as the index calculator 214, may then determine a financial index value 260, such as by using the enhanced time series 223, 225 using the enhanced financial transaction information time series 223, 225. In some cases, filtering the financial transaction information may include determining at least one of a first time series 222 of financial transaction information associated with a first financial product 240 and a second time series 224 of financial information associated with a second financial product 240 over time, and applying a filter (e.g., the filter 230) to each of the first time series 222 and the second time series 224 to minimize noise in the financial transaction information. In some cases, filtering the financial transaction information includes using a recursive filter (e.g., the Kalman filter 232), a smoothing spline 234 and/or a combination of the recursive filter and the smoothing spline.

In some embodiments, the method 400 may include estimating, by the exchange computer system 210, a financial transaction value, the financial transaction value missing from the financial transaction information obtained over the duration, such as by using the filter 230. The method 400 may further include enhancing the financial transaction information using the estimated financial transaction value. In some embodiments the method may further include assigning, by the computer device, a confidence level to the estimated financial transaction value, comparing the confidence level to a specified threshold, and delaying a calculation of the financial index value until the confidence level meets a specified criterion. For example, the filter may assign a confidence factor to an estimate for a financial transaction value. If the assigned confidence factor is less than a particular threshold (e.g., about 95%, about 90%, about 80%, etc.) the exchange computer system may delay the index calculator 214 from computing an index value for that time period until the associated confidence factor meets the specified criterion. In some embodiments, the method may further include defining a futures product based, at least in part, on the computed index value 260. In such cases, the method may further include determining a cash settlement value associated with the derivatives product 270 based, at least in part, on the financial index value 260.

In some embodiments, the method 400 may include obtaining, by the exchange computer system 210, financial transaction information about two or more different financial products 240 into a time series 222, 224 for each of the two or more financial products 240, determining, exchange computer system 210, an enhanced time series 223, 225 of financial transaction information for each of the two or more financial products using a Kalman filter 232, and determining, by the index calculator 214, a financial index value based, at least in part, on the enhanced time series 223, 225 of financial transaction information, the financial index value associated with a specified duration. In some cases, the Kalman filter 232 may filter the time series 222, 224 in conjunction with a spline 234. In some cases, the exchange computer system 210 may determine a cash settlement price (e.g., by the settlement calculator 216) for a derivatives product 270 associated with the two or more financial products 240, the cash settlement price based, at least in part, on the financial index value 260. In some cases, the method may include estimating, by the exchange computer system, a financial transaction value, the financial transaction value missing from the financial transaction information obtained over the duration, and enhancing the financial transaction information with the estimated financial transaction value. In some cases, the method may include displaying, on a display 212, the financial index value to a user, such as the market participant 250.

CONCLUSION

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that some steps illustrated in the figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:

receiving, by an index calculator of an exchange computing system, data from a market data module corresponding to first and second financial products over a duration, wherein the received data comprises time series data including price values at particular times and missing price values for other times for the first and second financial products during the duration, wherein a portion of the price values comprise noise;

determining, from the received data, at least one of a first time series data associated with the first financial product and a second time series data associated with the second financial product over time and storing the determined at least one first and second time series data in a memory coupled with the index calculator, the memory further including a state space model associated with at least a portion of a financial market;

applying, by a filter module of the exchange computing system coupled with the memory and using the state space model included therein, a filter to each of the first time series data and the second time series data, the applying comprising:

generating enhanced first and second times series data, by the filter module, by filtering, using a Kalman filter, the stored determined at least one first and second time series data to:

estimate missing price values from each of the first and second time series data obtained over the duration; and enhance each of the first and second time series data by inserting the estimated missing price values therein, and storing the enhanced first and second times series data in the memory; and generating smoothed enhanced first and second time series data, by the filter module, by filtering, using a smoothing spline, the stored enhanced first and second time series data in order to minimize occurrences of noise in each of the enhanced first and second time series data, reducing impact thereof on accuracy of a result of a calculation of a financial index value; and wherein the method further comprises:

assigning, by the index calculator, a confidence level to the estimated missing values;

comparing, by the index calculator, the confidence level to a criterion comprising a specified threshold to determine whether the confidence level meets the criterion;

determining, by the index calculator of the exchange computing system, based on the comparing, when the confidence level meets the criterion, the financial index value using the stored determined at least one first and second time series data and the stored smoothed enhanced first and second times series data for each of the first and second financial products; and delaying, by the index calculator, based on the comparing, the calculation of the financial index value until the confidence level meets the criterion.

2. The method of claim 1, wherein generating enhanced first and second time series data includes using a recursive filter.

3. The method of claim 1, wherein the smoothing spline includes at least one of a cubic spline, a B-spline, an M-type smoothing spline, and a Bézier spline.

4. The method of claim 1, comprising:
determining, by a settlement calculator, a cash settlement value associated with a derivatives contract based, at least in part, on the financial index value.

5. The method of claim 1, wherein generating first and second time series data includes filtering an interest rate associated with each of the first and second financial products over the duration; and determining, by the index calculator, a financial index value based, at least in part, of the filtered interest rate of the first and second financial products over the duration.

* * * * *